Patented Oct. 12, 1954

2,691,630

UNITED STATES PATENT OFFICE 2,691,630

DRILLING FLUID FOR HIGH-TEMPERATURE WELLS

Thomas E. Watkins, Dallas, Tex., assignor, by mesne assignments, to Socony-Vacuum Oil Company, Incorporated, New York, N. Y., a corporation of New York No Drawing. Application March 22, 1952, Serial No. 278,115

14 Claims. (Cl. 252—8.5)

This invention relates to drilling fluids and relates more particularly to a drilling fluid for use in the drilling of wells through earth formations having elevated temperatures.

In the rotary drilling of wells in the earth, a drilling fluid is continuously circulated from the surface of the earth through the drill pipe to the drill bit and then back to the surface of the earth through the annular space between the drill pipe and the walls of the well. The purposes of the drilling fluid, among others, are to cool and lubricate the drill bit and pipe, suspend and carry the cuttings to the surface of the earth, and impose a hydrostatic pressure on the earth formations penetrated by the well to prevent escape of gas or liquid from the earth formations to the well. Usually, drilling fluids are thixotropic, i. e., they increase in gel strength when quiescent and decrease in gel strength when agitated, whereby the cuttings may be readily separated from the drilling fluid at the surface of the earth and, in the event circulation of drilling fluid is stopped for any reason, the cuttings will be properly suspended by the drilling fluid within the well and not sink to the bottom thereof with resultant danger of sticking drill pipe. The thixotropic properties of a drilling fluid are ordinarily imparted thereto by virtue of employing as one of the constituents of the drilling fluid a clay such as bentonite. Since one of the functions of a drilling fluid is to impose a hydrostatic pressure on the formations penetrated by the well, it is desirable that the drilling fluid have a high density, and density of a drilling fluid is increased by adding thereto a weighting agent such as barite. Drilling fluids also often contain caustic soda which is added thereto to control viscometric properties, solubilize certain constituents, reduce corrosion, inhibit fermentation of organic additives, reduce the effect of contaminants picked up during drilling and to effect other results depending on the type of drilling fluid being employed.

While conventional drilling fluids containing clay, weighting agents, and caustic are ordinarily satisfactory for the drilling of relatively shallow wells where the temperatures of the formations penetrated by the well do not exceed about 150° F., various difficulties are encountered with such drilling fluids where the wells are relatively deep and the temperatures of the formations penetrated exceed about 150° F. For example, at temperatures above about 150° F., chemical reactions occur at appreciable rates between the clay, caustic, and calcium ions, the calcium ions being present in the drilling fluids as an ingredient or as a contaminant, to form set or cemented aggregates whereby the gel strengths of the drilling fluids become so high that pumping often becomes difficult or impossible. Further, it is often desirable to log the well and when circulation of drilling fluid is stopped for this purpose, the consistency of the drilling fluid becomes so high under the comparatively high temperature conditions prevailing that the logging tool is frequently unable to descend through the drilling fluid and restoration of circulation is thereafter frequently extremely difficult. Similarly, the increase in the consistency of the drilling fluid may become so high as to seriously hinder or prevent movement of drilling tools or well completion tools.

It is an object of this invention to provide a drilling fluid suitable for drilling through earth formations having temperatures in excess of about 150° F. It is another object of this invention to provide a low gel strength, high density drilling fluid. It is another object of this invention to provide a drilling fluid having a sufficiently low consistency at earth formation temperatures above about 150° F. to permit movement of drilling, logging, and completion tools therein. Further objects of the invention will become apparent from the following description thereof.

In accordance with the invention, there is provided a drilling fluid comprising water, oil emulsified therewith as a discontinuous phase, weighting agent, caustic, and lime, the weighting agent being in an amount at least as great as 300 pounds per barrel of drilling fluid, the caustic in an amount not greater than about one and one-half pounds per barrel of drilling fluid, and the lime being in an amount at least as great as the maximum amount which will dissolve in the drilling fluid. It is preferred that the drilling fluid contain clay admixed therewith, the clay being in an amount not greater than about ten pounds per barrel of drilling fluid.

I have found that such a drilling fluid is highly effective in the drilling of comparatively deep wells where the maximum temperatures of the earth formations exceed about 150° F. and drilling fluids of relatively high density are required to overcome formation pressures. Under these maximum temperature conditions, the viscosity and gel strength of such a drilling fluid remains sufficiently low that the drilling fluid continues to be pumpable. Further, the build-up in gel strength remains at a minimum after circulation of drilling fluid has been discontinued. Thus, the well can be logged without difficulties arising from inability of the logging tool to descend through the column of drilling fluid in the well, and thereafter circulation of drilling fluid can be restored. Also, hindrance to movement of drilling tools or well completion tools is at a minimum. Additionally, despite low viscosity and gel strength, such a drilling fluid has a satisfactorily high density.

As the weighting agent, barite is preferred. However, other types of weighting agents such as galena, iron oxide, etc., may be employed. The amount of weighting agent must be at least 300 pounds per barrel of drilling fluid in order that the drilling fluid will have a suitably high density to counteract formation pressures ordinarily encountered. Amounts of weighting agent in excess of 300 pounds per barrel of drilling fluid, such as 500 pounds per barrel of drilling fluid or greater amounts, may be employed to obtain greater densities if desired.

It is essential that the drilling fluid contain caustic and the amount of caustic should be at least one pound per barrel of drilling fluid although it should not be greater than about one and one-half pounds per barrel of drilling fluid. Sodium hydroxide is the preferred caustic. While I do not wish to be limited to the consequences of any theory, it appears that the hydroxyl ion of the caustic is absorbed on the solid constituents of the drilling fluid and serves to maintain the solid constituents in a satisfactory state of dispersion. On the other hand, the amount of caustic should not exceed about one and one-half pounds per barrel of drilling fluid since apparently at earth formation temperatures in excess of about 150° F. greater amounts of caustic tend to promote the formation of a zeolite type of compound which reacts with the calcium ions of the lime and with quartz picked up by the drilling fluid from the earth formations to form complex sodium calcium aluminum silicates or complex silicates, which in turn form set or cemented aggregates increasing the gel strength of the drilling fluid to inordinately high levels.

The drilling fluid must contain lime and the lime must be in an amount at least as great as the maximum amount which will dissolve in the drilling fluid. The drilling fluid is thus saturated with respect to dissolved lime. However, amounts of lime greater than the amount required to saturate the drilling fluid may be employed as desired. In a preferred embodiment of the invention, the drilling fluid contains seven pounds of lime per barrel of drilling fluid.

While clay is not an essential component of the drilling fluid, it is preferred that the drilling fluid contain clay. The clay should be in an amount not greater than about ten pounds per barrel of drilling fluid and in a preferred embodiment the drilling fluid contains clay in an amount of five pounds per barrel of drilling fluid. Any type of clay suitable for use in drilling fluids may be employed but bentonite is preferred.

The liquid constituent of the drilling fluid comprises water having oil emulsified therewith, the oil being the discontinuous phase. The oil may be any type of oil heretofore employed for preparing emulsion drilling fluids. Generally, diesel oil is satisfactory and is to be preferred to lighter oils since the use of diesel oil is free of the hazards involved in the use of lighter oils. The amount of oil employed may be as desired but usually will be between about five and twenty per cent by volume of the drilling fluid.

While weighting agent, caustic, and lime are the essential solid constituents of the drilling fluid, various other materials or additives may be employed in the drilling fluid for desired purposes. Thus, additives such as tannin-containing materials, exemplified by quebracho, or lignin-containing materials may be employed for the purpose of obtaining improved dispersion of solids in the drilling fluid. Further, tannin-containing or lignin-containing materials may be employed for the purpose of assisting emulsification of the oil with the water. Other emulsification agents such as starch may similarly be employed in admixture in the drilling fluid. It is desirable to employ a water loss agent in the drilling fluid where the well is to be logged in order that the filter cake build-up will be at a minimum during the time circulation of drilling fluid is discontinued. Starch is an effective water loss agent although other water loss agents such as sodium carboxymethyl-cellulose may be employed.

In a preferred embodiment of the invention, the drilling fluid, in addition to liquid constituent and any desired additive, contains 500 pounds per barrel of barite weighting agent, one and one-half pounds per barrel of sodium hydroxide caustic, and sufficient lime to saturate the drilling fluid. In a more particularly preferred embodiment, the drilling fluid has the following composition:

| | |
|---|---|
| Bentonite | 5 pounds per barrel of drilling fluid. |
| Barite | 500 pounds per barrel of drilling fluid. |
| Sodium hydroxide | 1.5 pounds per barrel of drilling fluid. |
| Calcium hydroxide | 7 pounds per barrel of drilling fluid. |
| Quebracho | 2 pounds per barrel of drilling fluid. |
| Lignin | 2 pounds per barrel of drilling fluid. |
| Starch | 8 pounds per barrel of drilling fluid. |
| Oil | 15 percent by volume of drilling fluid. |

Water to make one barrel.

The particularly preferred embodiment of the drilling fluid has a density of about 17.3 pounds per gallon, a viscosity of about 130 centipoises (Stormer), and a water loss of about 0.8 cubic centimeter as measured by the A. P. I. 30-minute water loss test. Additionally, the build up in shear strength of this drilling fluid with aging at 300° F. for 60 hours is less than 150 pounds per 100 square feet.

The following example will be illustrative of the invention.

An oil well was being drilled in Allen Parish, Louisiana, with a conventional lime-base, oil-water emulsion drilling fluid containing amounts of clay which varied from time to time depending upon changes in liquid and solid content for control of viscosity and gel strength but which remained greater than about 50 pounds per barrel as is customary with such drilling fluids. As a depth of 17,800 feet was reached, the gel strength of the drilling fluid increased as a result of the effect of the high bottom hole temperatures to the point where circulation was severely handicapped. Additionally, the gel strength of the drilling fluid reached a level which was sufficient to prevent logging tools from settling through the fluid. Attempts to reduce the high gel strengths by diluting with oil and water, weighting back up to the desired density, and admixing the necessary emulsifying, dispersing, and water loss additives were futile inasmuch as the drilling fluid rapidly regained a high gel strength.

The drilling fluid in the well and tanks was displaced with a drilling fluid having the same composition as the drilling fluid disclosed above as the particularly preferred embodiment of the invention and drilling was continued. No difficulty was encountered with respect to increase in gel strength of this drilling fluid during the continued drilling operations. Further, logging tools were easily run through the drilling fluid for logging of the well, the tool descending through the hole at a rate of about three feet per second. On two occasions during subsequent drilling, circulation of drilling fluid was stopped for periods of 65 hours and 83 hours, respectively, and there was no evidence of excessive gelation occurring as indicated by the relatively low pump pressures required to break circulation.

Having thus described my invention, it will be understood that such description has been given by way of illustration and example and not by way of limitation, reference for the latter purpose being had to the appended claims.

I claim:

1. A drilling fluid for drilling in earth formations at a temperature in excess of 150° F., said drilling fluid comprising water, oil emulsified therewith, weighting agent, caustic, and lime, the weighting agent being in an amount at least as great as about 300 pounds per barrel of drilling fluid, the caustic being in an amount of at least one pound but not greater than about one and one-half pounds per barrel of drilling fluid, and the lime being in an amount at least as great as the maximum amount which will dissolve in the drilling fluid.

2. A drilling fluid for drilling in earth formations at a temperature in excess of 150° F., said drilling fluid comprising water, oil emulsified therewith, weighting agent, caustic, lime, and clay, the weighting agent being in an amount at least as great as about 300 pounds per barrel of drilling fluid, the caustic being in an amount of at least one pound but not greater than about one and one-half pounds per barrel of drilling fluid, the lime being in an amount at least as great as the maximum amount which will dissolve in the drilling fluid, and the clay being in an amount not greater than about ten pounds per barrel of drilling fluid.

3. A drilling fluid for drilling in earth formations at a temperature in excess of 150° F., said drilling fluid comprising water, oil emulsified therewith, weighting agent, caustic, and lime, the oil being in an amount between about five and twenty per cent by volume of the drilling fluid, the weighting agent being in an amount at least as great as about 300 pounds per barrel of drilling fluid, the caustic being in an amount of at least one pound but not greater than about one and one-half pounds per barrel of drilling fluid, and the lime being in an amount at least as great as the maximum amount which will dissolve in the drilling fluid.

4. A drilling fluid for drilling in earth formations at a temperature in excess of 150° F., said drilling fluid comprising water, oil emulsified therewith, weighting agent, caustic, lime, and clay, the oil being in an amount between about five and twenty per cent by volume of the drilling fluid, the weighting agent being in an amount at least as great as about 300 pounds per barrel of drilling fluid, the caustic being in an amount of at least one pound but not greater than about one and one-half pounds per barrel of drilling fluid, the lime being in an amount at least as great as the maximum amount which will dissolve in the drilling fluid, and the clay being in an amount not greater than about ten pounds per barrel of drilling fluid.

5. A drilling fluid for drilling in earth formations at a temperature in excess of 150° F., said drilling fluid comprising water, oil emulsified therewith, barite weighting agent, sodium hydroxide caustic, and lime, the barite weighting agent being in an amount at least as great as about 300 pounds per barrel of drilling fluid, the sodium hydroxide caustic being in an amount of at least one pound but not greater than about one and one-half pounds per barrel of drilling fluid, and the lime being in an amount at least as the maximum amount which will dissolve in the drilling fluid.

6. A drilling fluid for drilling in earth formations at a temperature in excess of 150° F., said drilling fluid comprising water, oil emulsified therewith, barite weighting agent, sodium hydroxide caustic, lime, and bentonite clay, the barite weighting agent being in an amount at least as great as about 300 pounds per barrel of drilling fluid, the sodium hydroxide caustic being in an amount of at least one pound but not greater than about one and one-half pounds per barrel of drilling fluid, the lime being in an amount at least as great as the maximum amount which will dissolve in the drilling fluid, and the bentonite clay being in an amount not greater than about 10 pounds per barrel of drilling fluid.

7. A drilling fluid for drilling in earth formations at a temperature in excess of 150° F., said drilling fluid comprising water, oil emulsified therewith, barite weighting agent, sodium hydroxide caustic, and lime, the barite weighting agent being in an amount at least as great as about 500 pounds per barrel of drilling fluid, the sodium hydroxide caustic being in an amount of at least one pound but not greater than about one and one-half pounds per barrel of drilling fluid, and the lime being in an amount at least as great as the maximum amount which will dissolve in the drilling fluid.

8. A drilling fluid for drilling in earth formations at a temperature in excess of 150° F., said drilling fluid comprising water, oil emulsified therewith, barite weighting agent, sodium hydroxide caustic, and lime, the oil being in an amount between about 5 and 20 per cent by volume of the drilling fluid, the barite weighting agent being in an amount at least as great as about 300 pounds per barrel of drilling fluid, the sodium hydroxide caustic being in an amount of at least one pound but not greater than about one and one-half pounds per barrel of drilling fluid, and the lime being in an amount at least as great as the maximum amount which will dissolve in the drilling fluid.

9. A drilling fluid for drilling in earth formations at a temperature in excess of 150° F., said drilling fluid comprising water, oil emulsified therewith, barite weighting agent, sodium hydroxide caustic, lime, and bentonite clay, the oil being in an amount between about 5 and 20 per cent by volume of the drilling fluid, the barite weighting agent being in an amount at least as great as about 300 pounds per barrel of drilling fluid, the sodium hydroxide caustic being in an amount of at least one pound but not greater than about one and one-half pounds per barrel of drilling fluid, the lime being in an amount at least as great as the maximum amount which will dissolve in the drilling fluid, and the bentonite clay being in an amount not greater than about 10 pounds per barrel of drilling fluid.

10. A drilling fluid for drilling in earth formations at a temperature in excess of 150° F., said drilling fluid comprising water, oil emulsified therewith, barite weighting agent, sodium hydroxide caustic, lime, and bentonite clay, the barite weighting agent being in an amount of about 500 pounds per barrel of drilling fluid, the sodium hydroxide caustic being in an amount of at least one pound but not greater than about one and one-half pounds per barrel of drilling fluid, the lime being in an amount at least as great as the maximum amount which will dissolve in the drilling fluid and the bentonite clay being in an amount of about 5 pounds per barrel of drilling fluid.

11. A drilling fluid for drilling in earth formations at a temperature in excess of 150° F., said drilling fluid comprising water, oil emulsified therewith, barite weighting agent, sodium hydroxide caustic, and lime, the barite weighting agent being in an amount of about 500 pounds per barrel of drilling fluid, the caustic being in an amount of at least one pound but not greater than about one and one-half pounds per barrel of drilling fluid, and the lime being in an amount of about 7 pounds per barrel of drilling fluid.

12. A drilling fluid for drilling in earth formations at a temperature in excess of 150° F., said drilling fluid comprising water, oil emulsified therewith, barite weighting agent, sodium hydroxide caustic, lime, and bentonite clay, the barite weighting agent being in an amount of about 500 pounds per barrel of drilling fluid, the sodium hydroxide caustic being in an amount of at least one pound but not greater than about one and one-half pounds per barrel of drilling fluid, the lime being in an amount of about 7 pounds per barrel of drilling fluid, and the bentonite clay being in an amount of about 5 pounds per barrel of drilling fluid.

13. A drilling fluid for drilling in earth formations at a temperature in excess of 150° F., said drilling fluid comprising water, oil emulsified therewith, barite weighting agent, sodium hydroxide caustic, lime, and bentonite clay, the oil being in an amount of about 15 per cent by volume of the drilling fluid, the barite weighting agent being in an amount of about 500 pounds per barrel of drilling fluid, the caustic being in an amount of at least one pound but not greater than about one and one-half pounds per barrel of drilling fluid, the lime being in an amount of about 7 pounds per barrel of drilling fluid, and the bentonite clay being in an amount of about 5 pounds per barrel of drilling fluid.

14. A drilling fluid for drilling earth formations at a temperature in excess of 150° F., said drilling fluid comprising bentonite clay in an amount of about five pounds per barrel of drilling fluid, barite weighting agent in an amount of about 500 pounds per barrel of drilling fluid, sodium hydroxide caustic in an amount of at least one pound but not greater than about one and one-half pounds per barrel of drilling fluid, lime in an amount of about seven pounds per barrel of drilling fluid, quebracho in an amount of about two pounds per barrel of drilling fluid, lignin in an amount of about two pounds per barrel of drilling fluid, starch in an amount of about eight pounds per barrel of drilling fluid, oil in an amount of about fifteen volume per cent of said drilling fluid, and water.

References Cited in the file of this patent

UNITED STATES PATENTS

| Number | Name | Date |
|---|---|---|
| 2,488,304 | Malott | Nov. 25, 1949 |
| 2,542,019 | Fischer | Feb. 20, 1951 |
| 2,555,794 | Henkes | June 5, 1951 |
| 2,573,959 | Fischer | Nov. 6, 1951 |

FOREIGN PATENTS

| Number | Country | Date |
|---|---|---|
| 456,785 | Canada | May 17, 1949 |

OTHER REFERENCES

Van Dyke et al.: Chemicals Used in Red-Lime Muds, article in Industrial and Engineering Chemistry, vol. 42, pages 1901 to 1904, September 1950.

Van Dyke: Oil Emulsion Drilling Mud, article in World Oil, November 1950, Drilling Section, pages 101–104 and 106.

McCray: Chemistry and Control of Lime Drilling Muds, article in the Petroleum Engineer, November 1949, pages B54, B56, and B58.